United States Patent
Okuda et al.

(10) Patent No.: US 10,077,983 B2
(45) Date of Patent: Sep. 18, 2018

(54) INFORMATION DISPLAY DEVICE AND METHOD

(71) Applicant: Furuno Electric Co., Ltd., Nishinomiya (JP)

(72) Inventors: Masato Okuda, Nishinomiya (JP); Takashi Omori, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 14/710,231

(22) Filed: May 12, 2015

(65) Prior Publication Data
US 2015/0330803 A1  Nov. 19, 2015

(30) Foreign Application Priority Data
May 13, 2014 (JP) .................................. 2014-099232

(51) Int. Cl.
*G01C 21/20* (2006.01)
*G01C 21/36* (2006.01)

(52) U.S. Cl.
CPC ........... *G01C 21/20* (2013.01); *G01C 21/203* (2013.01); *G01C 21/3664* (2013.01); *G01C 21/3691* (2013.01)

(58) Field of Classification Search
CPC .... G01C 21/20; G01C 21/3664; G01C 15/00; G01C 21/32; G01C 21/36; G01C 21/3635;
(Continued)

(56) References Cited

U.S. PATENT DOCUMENTS 5,793,310 A * 8/1998 Watanabe .......... G01C 21/3635
340/990
5,936,553 A * 8/1999 Kabel ................ G01C 21/3635
340/990
(Continued)

FOREIGN PATENT DOCUMENTS

JP  H07220055 A  8/1995
JP  H08166764 A  6/1996
(Continued)

OTHER PUBLICATIONS

United States Patent and Trademark Office, Office Action Issued in U.S. Appl. No. 14/710,274, dated Apr. 6, 2016, 19 pages.
(Continued)

*Primary Examiner* — Genna M Mott
(74) *Attorney, Agent, or Firm* — Alleman Hall Creasman & Tuttle LLP (57) ABSTRACT

An information display device is provided. The information display device includes a memory configured to store information along with its position, a display unit configured to display the information, and a controller configured to control the display unit. The controller controls the display unit to simultaneously display first and horizontal plot sections. In the perspective plot section, part of the information is displayed such that its display position in vertical directions becomes higher as a distance from the information display device or a movable body to which the device is mounted, to the position becomes longer. In the horizontal plot section, other part of the information is displayed such that its display position is changed in lateral directions according to an azimuth of the position with respect to the information display device or the movable body, and the display position is fixed in the vertical directions regardless of the distance.

16 Claims, 7 Drawing Sheets

(58) Field of Classification Search
CPC .. G01C 21/367; G01C 21/3679; G01C 23/00; G01C 23/005; G06T 17/05; G06T 15/20; G06T 19/00; G06T 19/003; G06T 19/006; G06T 2207/30252; G06T 2215/16; B60R 1/00; B60R 2300/301; B60R 2300/302; B60R 2300/305; B60R 2300/307; B60R 2300/8086; B60R 2300/8093; G02B 2027/014; G02B 27/017; G02B 2027/0141; G02B 2027/0178; G02B 27/01; G02B 27/0101; G02B 27/0172; G02B 27/2221; G02B 27/2292; G06F 3/011; G06F 3/04815; G09F 19/14; G09G 2340/0471; G09G 2340/0478; G09G 2380/10; G09G 2380/12; G09G 3/003; B64D 45/00

See application file for complete search history.

(56) References Cited

U.S. PATENT DOCUMENTS

| | | | |
|---|---|---|---|
| 9,057,773 B1* | 6/2015 | Fersdahl | G01S 13/953 |
| 9,767,534 B2* | 9/2017 | Dohi | G01W 1/02 |
| 2006/0052934 A1 | 3/2006 | Tomita et al. | |
| 2008/0147257 A1 | 6/2008 | Kuhlgatz et al. | |
| 2008/0273109 A1 | 11/2008 | Bamford | |
| 2009/0271105 A1 | 10/2009 | Kindo et al. | |
| 2010/0057358 A1 | 3/2010 | Winer et al. | |
| 2010/0240988 A1* | 9/2010 | Varga | G02B 27/017 600/425 |
| 2011/0196604 A1 | 8/2011 | Kindo et al. | |
| 2011/0319750 A1* | 12/2011 | Hara | H04L 67/12 600/424 |
| 2012/0274504 A1 | 11/2012 | Kubota | |
| 2012/0274509 A1 | 11/2012 | Tsai et al. | |
| 2013/0018677 A1 | 1/2013 | Chevrette | |
| 2013/0286022 A1 | 10/2013 | Kubota et al. | |
| 2014/0043322 A1* | 2/2014 | Fulks | G06T 19/006 345/419 |
| 2014/0160165 A1* | 6/2014 | Kim | G06T 19/006 345/633 |
| 2014/0253597 A1* | 9/2014 | Dohi | G01W 1/02 345/656 |
| 2014/0257689 A1 | 9/2014 | Miichi et al. | |
| 2015/0330804 A1 | 11/2015 | Okuda et al. | |

FOREIGN PATENT DOCUMENTS

| | | |
|---|---|---|
| JP | H09229710 A | 9/1997 |
| JP | 2004212192 A | 7/2004 |
| JP | 2007026200 A | 2/2007 |
| JP | 2012233743 A | 11/2012 |
| JP | 2013231844 A | 11/2013 |

OTHER PUBLICATIONS

United States Patent and Trademark Office, Office Action Issued in U.S. Appl. No. 14/710,274, dated Jul. 19, 2016, 16 pages.

* cited by examiner

INFORMATION DISPLAY DEVICE AND METHOD

CROSS-REFERENCE TO RELATED APPLICATION(S)

This application claims priority under 35 U.S.C. § 119 to Japanese Patent Application No. 2014-099232, which was filed on May 13, 2014, the entire disclosure of which is hereby incorporated by reference.

TECHNICAL FIELD

This disclosure generally relates to an information display device, which displays information of a situation around a predetermined position (e.g., a position of an own position).

BACKGROUND OF THE INVENTION

JP2013-231844A and JP2012-233743A disclose information display devices which display information of a situation around a predetermined position (e.g., a position of an own position). JP2013-231844A discloses a ship radar apparatus in which a first section and a second section are displayed on a display screen of a display unit. The first section is displayed closer to a display reference point than the second section, and the scale of the first section is smaller than the scale of the second section. JP2012-233743A discloses a radar indicator in which periphery information of the ship is displayed within a radar image display section, and a display target (e.g., a movable body, a landmark, or a user registering point) of which position corresponds to a point outside the radar image display section is displayed outside the radar image display section according to a direction of the display target from a display reference point.

However, the configurations of JP2013-231844A and JP2012-233743A achieve no more than providing a user a radar image seen from a direction of looking down at the ship, and a display specification that promotes instinctive understanding from the user by taking a line of sight of the user who actually steers the ship into consideration is not definitely achieved.

SUMMARY OF THE INVENTION

The purpose of this disclosure relates to providing an information display device, which is providable of information to a user in a form in which the overall information and detailed information are well balanced, and achievable of displaying images from a view close to an actual line of sight of the user.

According to a first aspect of this disclosure, an information display device with the following configuration is provided. Specifically, the information display device includes a GNSS receiver configured to receive an own position, a memory configured to store information along with a position, a display unit configured to display the information on a display screen thereof, and a controller configured to control the display unit. The controller controls the display unit to simultaneously display a perspective plot section and a horizontal plot section. In the perspective plot section, part of the information located in a near area from the own position is displayed according to a distance and an azimuth of the information. In the horizontal plot section, other part of the information located in a far area from the own position is displayed according to direction of the information such that a display position thereof is changed in lateral directions of the display screen according to an azimuth of the information, and the display position is fixed in vertical directions of the display screen regardless of the distance of the information.

Thus, the information can be provided to the user in a form in which the overall information and detailed information are well balanced, for example the situation of the wide area is provided in a simple form and the situation near the information display device (own position) is provided in detail, while achieving in providing display images from a view close to an actual line of sight of the user.

The information display device preferably has the following configuration. Specifically, in the vertical directions of the display screen, the horizontal plot section is disposed on the upper side of the perspective plot section.

Thus, a natural positional relationship between a near view and a distant view can be obtained on the display screen, and the parts of the information can be displayed at suitable positions.

The controller preferably controls the display unit to display the own position at a display position fixed in the lateral directions of the display screen.

Thus, by constantly fixing the display position of the own position to the center of the display screen in the lateral directions, an image close to a user's actual perspective that changes as the own position can be provided.

The information display device may have the following configuration. Specifically, the controller controls the display unit to display a designated route at a display position fixed in the lateral directions on the display screen. The controller controls the display unit to display the own position in the form of an icon.

Thus, the user can easily understand the own position based on the designated route.

The controller preferably controls the display unit to also display an azimuth scale within the horizontal plot section.

Thus, the user can easily understand the azimuth of the information displayed in the horizontal plot section by referring to the azimuth scale.

The information display device preferably has the following configuration. Specifically, the information displayed within the perspective plot section is dynamic information, and the information displayed within the horizontal plot section is static information.

Thus, a change of situation can easily be reflected in the perspective plot section indicating the situation near the information display device (own position), and a movement of the display screen can be suppressed in the horizontal plot section indicating the situation comparatively farther from the information display device (own position). As a result, it can be achieved that the display image corresponding to the user's perspective of wanting to pay comparatively great attention to the situation of the near area is provided.

The information display device preferably has the following configuration. Specifically, the information displayed within the perspective plot section is either one of information received through external communication and information detected by a sensor. The information displayed within the horizontal plot section is information obtained from map information.

Thus, the reasonable display manner can be achieved in each of the perspective plot section and the horizontal plot section.

The information received through the external communication is preferably any of weather, wind direction, wind speed, water temperature, water current, and information of other ship.

Thus, the information including weather that is important to the user can be displayed at least in the perspective plot section.

The information detected by the sensor is preferably information detected by either one of a radar and a sonar.

Thus, a detailed situation near the information display device (own position) can be displayed at least in the perspective plot section.

The information stored in the memory preferably includes any of information of a target object, information of a location registered by a user, and landmark information.

Thus, the user can easily understand the useful information as described above.

The controller preferably controls the display unit to display a meter section in which at least one of a situation of the information display device and a situation of the own ship is displayed, simultaneously with the first and horizontal plot sections.

Thus, the user can understand a specific situation of the either one of the information display device and the own ship by checking the contents in the meter section.

The information displayable within the meter section preferably includes at least one of a position, speed, and azimuth of the either one of the information display device and the own ship.

Thus, the user can easily understand the useful information as described above.

According to a second aspect of this disclosure, the following method of displaying information that is stored along with a position on a display screen of a display unit of a device is provided. Specifically, the method includes causing the display unit to simultaneously display a perspective plot section and a horizontal plot section. In the perspective plot section, part of the information located in a near area from the own position is displayed according to a distance and an azimuth of the information. In the horizontal plot section, other part of the information located in a far area from the own position is displayed according to direction of the information such that a display position thereof is changed in lateral directions of the display screen according to an azimuth of the information, and the display position is fixed in vertical directions of the display screen regardless of the distance of the information.

Thus, the information can be provided to the user in a form in which the overall information and detailed information are well balanced, for example, the situation of the wide area is provided in a simple form and the situation near the information display device (own position) is provided in detail, while achieving in providing display images from a view close to an actual line of sight of the user.

The method further preferably includes disposing the horizontal plot section on the upper side of the first display screen.

Thus, a natural positional relationship between a near view and a distant view can be obtained on the display screen, and the parts of information can be displayed at suitable positions.

BRIEF DESCRIPTION OF THE DRAWING(S)

The present disclosure is illustrated by way of example and not by way of limitation in the figures of the accompanying drawings, in which the like reference numerals indicate like elements and in which.

DETAILED DESCRIPTION

Figure 1:
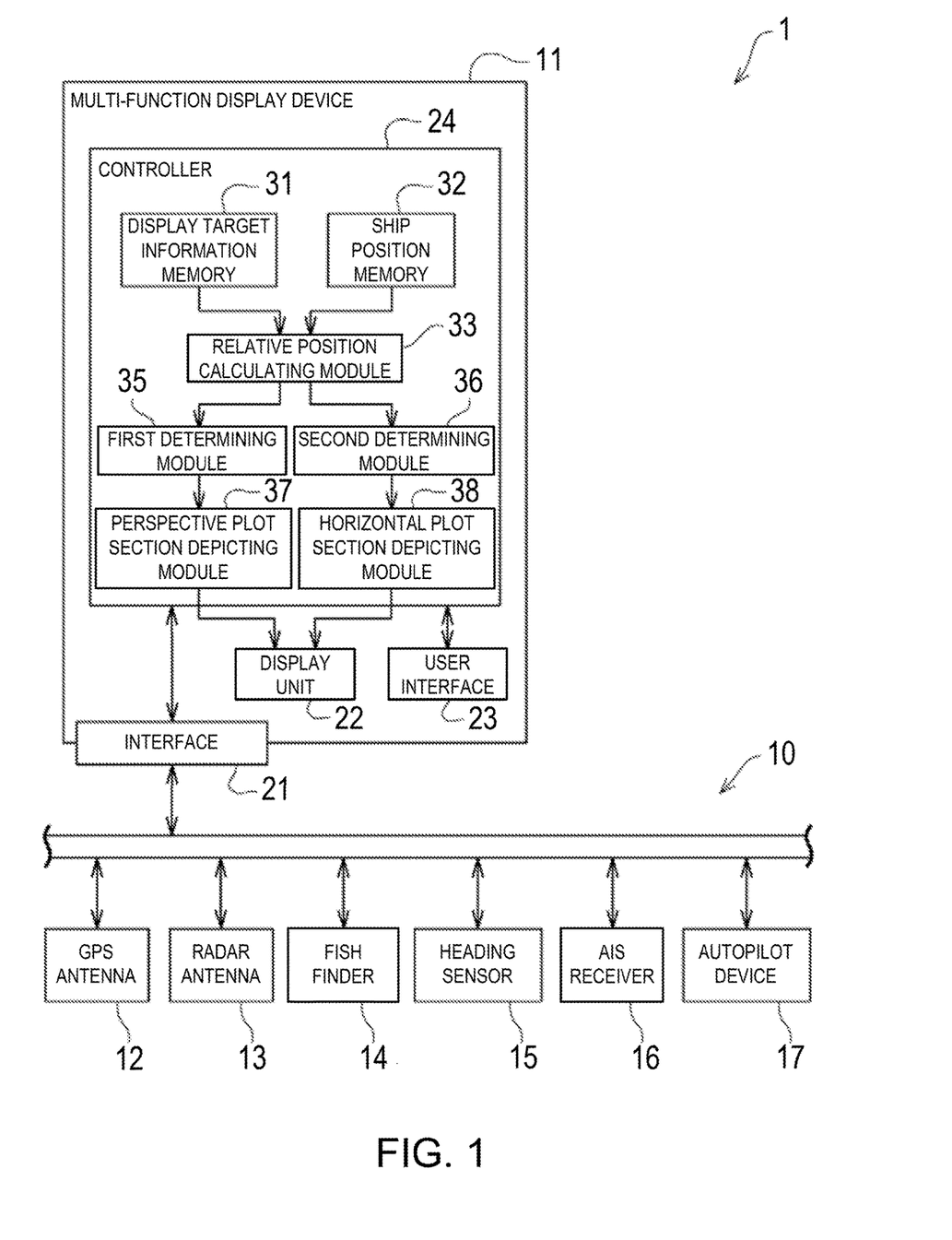
FIG. 1 is a block diagram illustrating an overall configuration of a ship instrument network system provided with a multi-function display device according to one embodiment of this disclosure.
Figure 2:
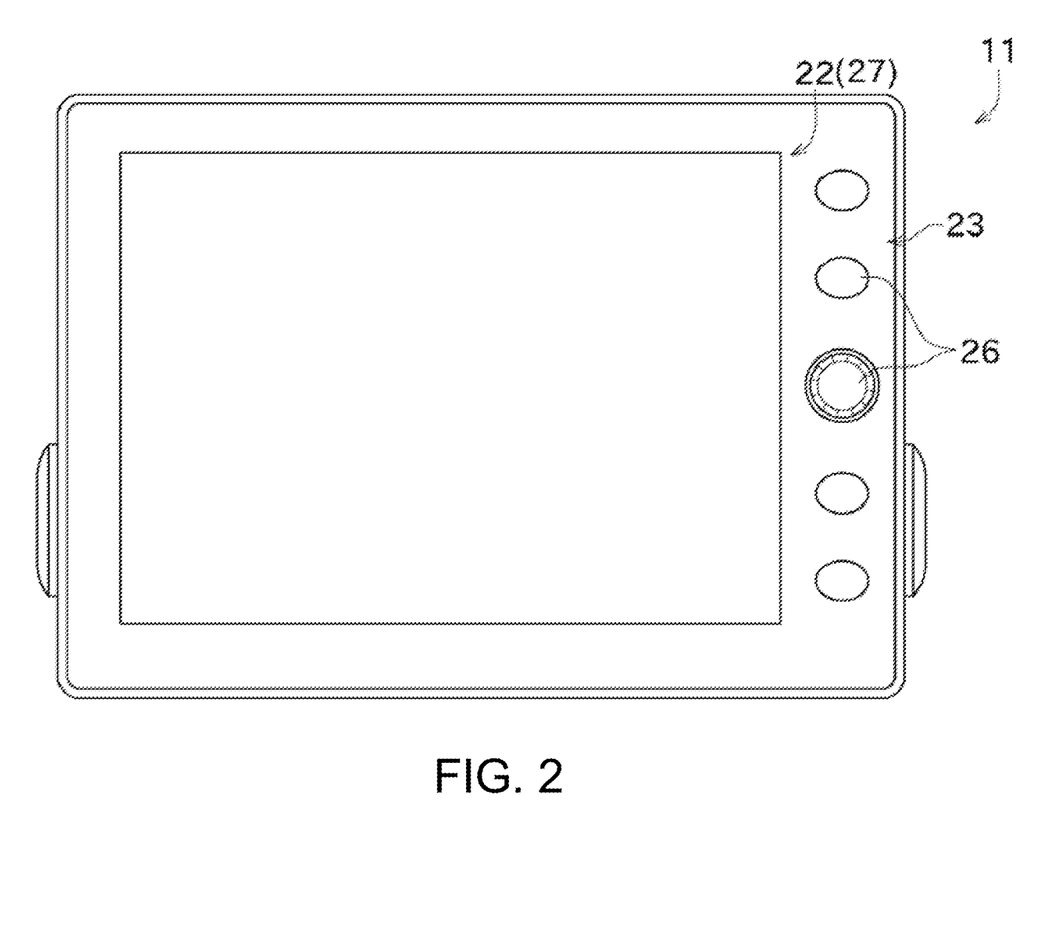
FIG. 2 is a front view illustrating an external view of the multi-function display device.

Next, one embodiment of this disclosure is described with reference to the appended drawings. FIG. 1 is a block diagram illustrating an overall configuration of a ship instrument network system 1 provided with a multi-function display device 11 according to this embodiment of this disclosure. FIG. 2 is a front view illustrating an external view of the multi-function display device 11.

The ship instrument network system 1 includes a plurality of ship instruments connected with a network 10. The ship instruments exchange detected information and the like, via the network 10. As the standard of the network 10, a LAN (Local Area Network) or a CAN (Controller Area Network) may be adopted, for example.

As illustrated in FIG. 1, the ship instrument network system 1 of this embodiment includes the multi-function display device (information display device) 11, a GPS antenna (GNSS sensor) 12, a radar antenna 13, a fish finder 14, a heading sensor 15, an AIS receiver 16, and an autopilot device 17. Hereinafter, these components may be referred to as the "ship instruments."

The multi-function display device 11 creates an image (sensor image) based on the information detected by the other ship instruments (sensors) and displays it, and performs various kinds of processing according to operation by a user.

Hereinafter, a specific configuration of the multi-function display device 11 is described. The multi-function display device 11 includes an interface 21, a display unit 22, a user interface 23, and a controller 24.

The interface 21 is configured as a network adaptor, etc. The multi-function display device 11 transceives various kinds of information with the other instruments configuring the ship instrument network system 1, via the interface 21.

The display unit 22 includes a liquid crystal display unit and displays the sensor image, various setting screens and the like on a display screen according to operation by the user. The sensor image is an image in which the information acquired by the sensor instruments is expressed graphically. Examples of the sensor image include a plotter image illustrating a nautical chart around a ship to which the ship instrument network system 1 (hereinafter, may be referred to as "the first ship," "the reference ship" or simply "the ship") is mounted, a radar image illustrating radar echoes around the first ship, a fish finding image of the fish finder, and also a three-dimensional navigation image described later.

As illustrated in FIG. 2, the user interface 23 includes various hardware keys 26 disposed near the display screen of the display unit 22, and a touch panel 27 disposed to the display screen of the display unit 22. The user can perform various instructions to the multi-function display device 11 by controlling the hardware keys 26 and touching the touch panel 27 of the display screen.

The controller 24 illustrated in FIG. 1 includes an operation unit (e.g., a CPU), and a memory comprised of a ROM and a RAM. These kinds of hardware cooperate with a display control program stored in the memory to control the display on the display unit 22.

Specifically, the controller 24 of the multi-function display device 11 creates various kinds of the sensor images as needed based on the stored contents in the memory and the information received from the other ship instruments, and displays them on the display unit 22. Particularly, as one of the sensor images, the controller 24 may display a navigation image in which a situation around an area in front of the first ship in its traveling route is expressed three-dimensionally (hereinafter, may be referred to as the "three-dimensional navigation image"). Note that, a control performed by the controller 24 for the three-dimensional navigation image is described later.

The GPS antenna 12 receives positioning signals from GPS satellites (GNSS satellites) and outputs them to the multi-function display device 11 and the like, via the network 10. The controller 24 of the multi-function display device 11 obtains a position of the first ship (specifically, a position of the GPS antenna) based on the positioning signals and stores it in a ship position memory 32 provided to the controller 24. Note that, a configuration in which the calculation for obtaining the position based on the positioning signals is performed on the GPS antenna 12 side and the position of the first ship (hereinafter, simply referred to as the "first ship position") is outputted to the multi-function display device 11 by the GPS antenna 12 may be adopted.

Here, the first ship position obtained by the GPS positioning described above indicates a terrestrial reference absolute position expressed by longitude and latitude. Note that, in the following description, such a terrestrial reference absolute position may be referred to as the absolute position.

The multi-function display device 11 exerts a function as a navigation device based on the first ship position obtained in the GPS positioning and nautical chart information (map information) stored in the multi-function display device 11 itself. Specifically, based on the obtained ship position and the stored nautical chart information, the multi-function display device 11 displays the first ship position on the display unit 22, by superimposing it on the nautical chart (plotter image). Moreover, the multi-function display device 11 obtains a ground speed and a trace of the first ship by utilizing ship position changed over time, and displays them on the display unit 22. Further, through the user selecting waypoints (a final destination and stopover points), the multi-function display device 11 creates a navigation route (designated route) and displays it on the display unit 22.

Note that, the GPS antenna 12 of this embodiment performs the positioning by a method called "differential GPS" (DGPS) so as to obtain the first ship position highly accurately. Specifically, GPS positioning errors are calculated at multiple DGPS base stations placed in Japan to cover the coastal sea areas of Japan, and the positioning errors (DGPS beacons) are broadcasted as correction information from the DGPS base stations. The GPS antenna 12 has a function as a DGPS beacon receiver, and by correcting the positioning result based on the correction information included in the DGPS beacons, the GPS antenna 12 can obtain the first ship position more accurately.

Each DGPS beacon described above may contain meteorological information and/or hydrographic information observed at a predetermined observation location (e.g., a lighthouse) close to the corresponding DGPS base station. The GPS antenna 12 can output the meteorological information and the hydrographic information (e.g., weather, a wind direction, a wind speed, a water temperature, and an ocean flow) and the position of the observation location which are obtained from the DGPS beacons, to the multi-function display device 11.

The radar antenna 13 constitutes a radar (sensor), and it transmits a microwave and receives a reflection wave from an object. The reflection wave is suitably signal-processed and then outputted to the multi-function display device 11. The multi-function display device 11 creates one of the radar images based on the reflection wave. Specifically, the controller 24 of the multi-function display device 11 obtains a distance of the object from the radar antenna 13 based on a time length from the transmission of the microwave to the reception of the reflection wave. Moreover, the controller 24 obtains a direction in which the object exists, based on a direction to which the microwave is transmitted. The controller 24 creates the radar image as described above and displays it on the display unit 22.

The multi-function display device 11 achieves a TT (Target Tracking) function by utilizing information obtained from the radar antenna 13. Although the detailed description of the TT function (ARPA function) is omitted since it is known, the TT function is for estimating a speed vector of a target object by automatically detecting and acquiring a position of the target object based on the radar echo obtained from the radar antenna 13, and tracking a movement of the target object over time. Thus, the controller 24 of the multi-function display device 11 can display the target object (e.g., another ship) currently tracked, on the display unit 22 by superimposing it on the sensor images, such as the plotter image, the radar image, and the three-dimensional navigation image.

Note that, due to the property of the radar detection, the position of the target object (e.g., other ship) obtained by the TT function described above should be considered as position relative to the first ship. In other words, the position of the target object obtained by using the TT function (TT: target object) is based on a distance from the first ship and an azimuth with respect to the first ship.

The fish finder 14 is comprised of a transducer and an analyzer. The transducer is installed in, for example, the bottom of the first ship, and discharges an ultrasonic wave directly below into the water at a predetermined timing (e.g., every predetermined period of time) and receives a reflection wave from the water bottom or a school of fish. The analyzer creates data indicating the school of fish or the like by analyzing the received reflection wave, and outputs it to the multi-function display device 11. The controller 24 of the multi-function display device 11 creates the fish finding image based on the received data and displays it on the display unit 22.

The heading sensor 15 detects a heading of the first ship (a direction to which a bow of the first ship is oriented) by a terrestrial reference absolute azimuth. Generally, a ship travels forward, toward its bow direction. Therefore, it can be said that the heading sensor 15 detects an azimuth of the forward direction of the hull of the first ship. For example, a magnetic azimuth sensor or a GPS compass may be used as the heading sensor 15.

The AIS receiver 16 receives AIS information outputted from an AIS (Automatic Identification System) installed in other ships (second ships). The AIS information includes the information of, for example, a position (absolute position), speed, and course of the corresponding second ship. The AIS receiver 16 outputs the AIS information received from the second ship, to the multi-function display device 11. The controller 24 of the multi-function display device 11 can display an AIS symbol indicating the second ship by superimposing it on the various sensor images, based on the received information.

The autopilot device 17 automatically controls a rudder of the first ship so that the first ship moves on the designated navigation route. Specifically, the autopilot device 17 obtains required change in the heading of the first ship based on the heading acquired from the heading sensor 15 and the navigation route acquired from the multi-function display device 11. Further, by changing a rudder angle according to the obtained value, the autopilot device 17 matches the course of the first ship with the navigation route.

The ship instrument network system 1 of this embodiment is configured as described above. Note that, the ship instruments constituting the ship instrument network system 1 are arbitrary, and a configuration in which ship instrument(s) (e.g., a sonar which is a kind of sensor) other than those described above are connected, or a configuration in which a plurality of similar types of ship instruments are connected may be adopted. Moreover, a configuration in which the processing of the data acquired by the ship instruments is performed by the ship instruments themselves may be adopted, or a configuration in which the processing of the data acquired by the ship instruments is performed by the controller 24 of the multi-function display device 11 may be adopted.

Next, an example of displaying the plotter image which is one of the sensor images displayable in the multi-function display device 11 is described with reference to FIG. 3.

Note that, hereinafter, the contents displayed on the display unit 22 in a case where the display screen is oriented vertically are described. However, without limiting to this, even when the display screen is oriented in other direction, for example, horizontal, the configuration disclosed herein can similarly be applied.

The display unit 22 of the multi-function display device 11 graphically displays the first ship position on the nautical chart based on the current positional information of the first ship obtained from the GPS antenna 12 (displays the plotter image).

Figure 3:
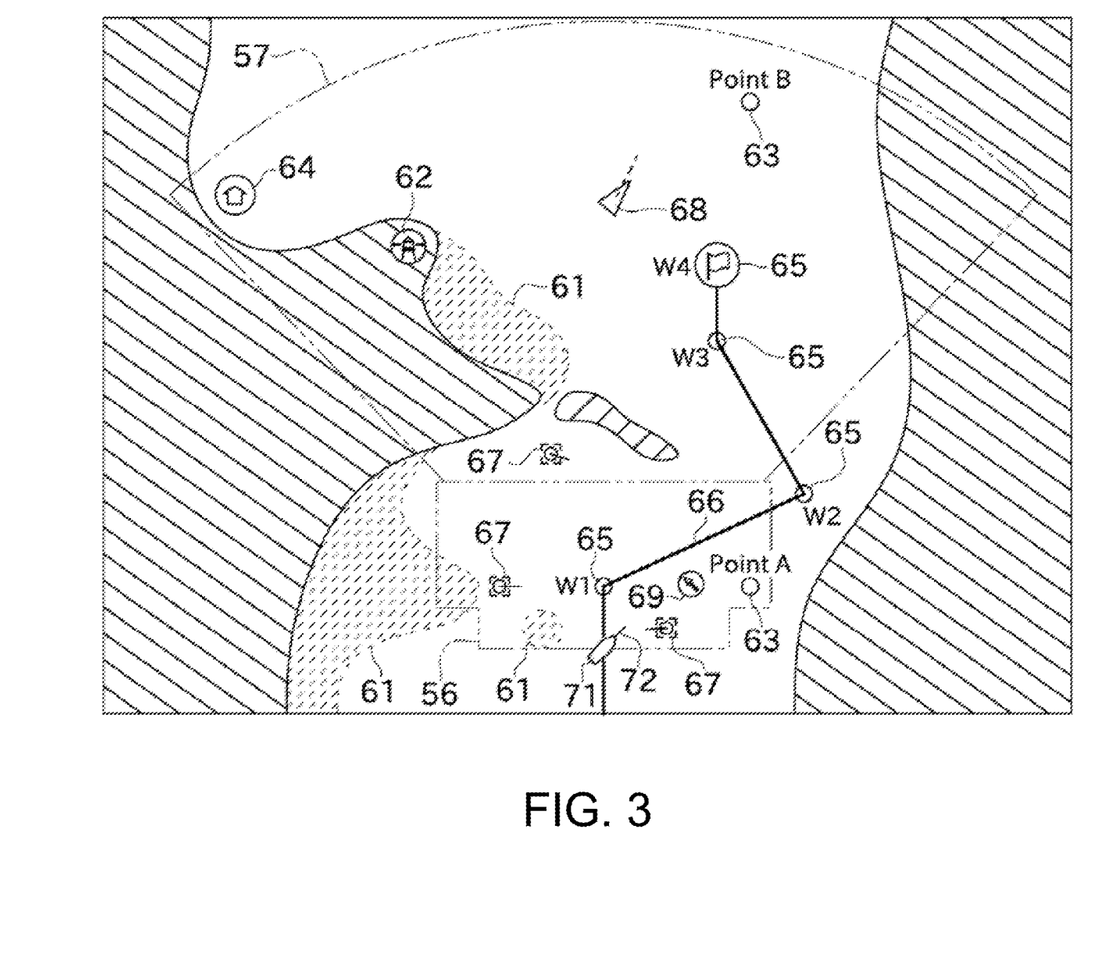
FIG. 3 is a view illustrating a plotter image displayable by the multi-function display device.

An example of the display contents of the plotter image is illustrated in FIG. 3. In the plotter image, the nautical chart information stored in the multi-function display device 11 is displayed.

The nautical chart information is an electronic record of the shape of coast line, water depths, positions of lighthouses and channel buoys, etc. The nautical chart information includes information of positions of dangerous areas where the water depth is shallow, and information of positions and names of landmarks.

The landmark is a reference mark during movement. Specific examples of the landmark during navigation include a lighthouse, a port, a mountain, an island, and a channel buoy. Note that, the definition of the landmark used herein does not only include what exists on land, but also what is disposed on water, such as the channel buoy.

The plotter image of FIG. 3 includes shallow water areas 61 indicating areas where the water depth is shallow and a landmark symbol 62 indicating a lighthouse which is a landmark.

Further, in the plotter image, point marks 63 which are user registering points, and a homeport mark 64 indicating a homeport of a particular case of the user registering point are displayed by superimposing them on the nautical chart.

The user registering point means a position registered by the user. For example, when a large amount of fish is caught at a certain point or existence of a school of fish is detected by the fish finder 14, the user can register the current position of the first ship as the user registering point by controlling the user interface 23. When the user registering point is created, the first ship position obtained by the GPS positioning, the date and time of the point registered, and the name of the point entered by the user, and the like are stored in the multi-function display device 11.

Further, in the plotter image, destination marks 65 indicating the selected waypoints, route lines 66 indicating a course to the destination (navigation route), and a wind direction-and-speed icon 69 indicating the wind status are displayed.

The navigation route means a scheduled route specified in the multi-function display device 11 by the user according to a navigation plan. For example, in a state where the nautical chart is displayed on the display screen of the display unit 22, the user performs touch operation on arbitrary locations to enter a desired final destination of the first ship, stopover points (intermediate destinations) to pass on the way to the final destination, and the like, to be the waypoints.

The selected waypoints are denoted with numbers indicating a passing order. The numbers are displayed near the destination marks 65. In this embodiment, the n-th waypoint is displayed with "Wn"; however, the display mode is not limited. Further, the route lines 66 are displayed to connect the waypoints (destination marks 65) in order. The destination marks 65 indicating the intermediate waypoints W1 to W3 are circle marks, whereas the destination mark 65 indicating the final destination waypoint W4 is a flag mark, so that the final destination which is considered to be more important to the user is displayed to stand out.

The wind direction-and-speed icon 69 indicates the wind direction and the wind speed included in the meteorological information obtained from the DGPS beacons, and is displayed at a point corresponding to the position where they are observed. In the wind direction-and-speed icon 69, the wind direction is expressed by the direction of an arrow, and the wind speed is expressed by the length of the arrow.

Further, in the plotter image, the current position of the first ship is displayed as a boat icon 71, and the heading is displayed as a designated course 72 in autopilot. Furthermore, in the plotter image, a TT target icon 67 indicating the TT target object described above (e.g., other ship), and an AIS second ship icon 68 indicating the second ship obtained by the AIS receiver are displayed. When the situation of the first ship, the second ship or the like is changed, the display position, orientation and/or the like of the corresponding icon are updated in real time.

Note that, the chain-lined sections in FIG. 3 (a first target section 56 and a second target section 57) are illustrated to describe the control of the three-dimensional navigation image described later, and are not actually displayed in the plotter image. Moreover, although it is not displayed in FIG. 3, a predicted traveling direction of the first ship, an actual trace of the first ship and the like can also be displayed in the plotter image in addition to the above contents.

Next, the three-dimensional navigation image is described. In the three-dimensional navigation image, the situation around the area in front of the first ship traveling on the designated navigation route is expressed in perspective.

Figure 4:
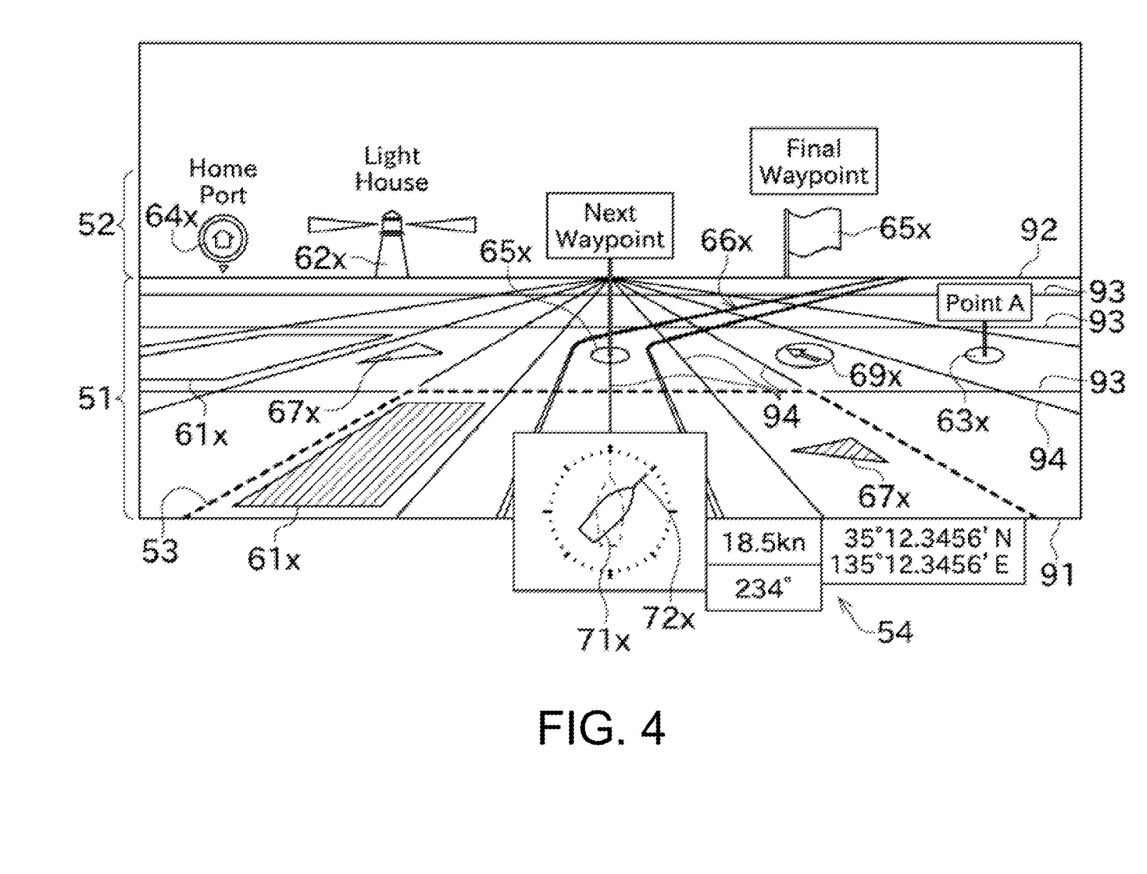
FIG. 4 is a view illustrating a three-dimensional navigation image.

The example of the display contents of the three-dimensional navigation image is illustrated in FIG. 4. Note that, the three-dimensional navigation image in FIG. 4 illustrates the same situation as the plotter image illustrated in FIG. 3, with a different view point.

As illustrated in FIG. 4, a first reference line 91 extending in the lateral directions of the display unit 22 is displayed at the bottom of the three-dimensional navigation image, and a second reference line 92 extending in the lateral directions is displayed above the first reference line 91.

The first and second reference lines 91 and 92 are oriented horizontally and in parallel to each other. Moreover, a plurality of horizontal straight lines 93 are depicted between the first and second reference lines 91 and 92, and the horizontal straight lines 93 are arranged such that an interval therebetween becomes narrower toward the second reference line 92 at the top.

A plurality of perspective lines 94 spreading radially from the center of the second reference line 92 in the lateral directions (the vanishing point in one-point perspective) are depicted between the first and second reference lines 91 and 92. By these lines 91 to 94, the water surface (sea surface) spreading around the first ship is expressed in perspective such that the upper side corresponds to the farther side and the lower side corresponds to the closer side.

In the section where the water surface is expressed (i.e., the section between the first and second reference lines 91 and 92), the various kinds of icons, symbols and marks other than that indicating the first ship are displayed such that their display positions change in the lateral directions (horizontal directions) according to the azimuth thereof with respect to the first ship. Moreover, the icons and the like change their display positions and sizes in the vertical directions according to the distance thereof from the first ship. In other words, the perspective is expressed by displaying the icons and the like lower and larger as the distance thereof is closer from the first ship. Therefore, in the following description, this section may be referred to as the perspective plot section (first display section) 51.

In the perspective plot section 51, a near view seen from the first ship is displayed. The user can grasp the azimuth and the distance of an object or point which requires attention with respect to the first ship, by looking at the display positions and sizes of the symbols and marks disposed within the perspective plot section 51.

The various kinds of icons, symbols and marks other than that indicating the first ship are displayed in the upper part of the perspective plot section 51 such that the display positions thereof change in the lateral directions (horizontal directions) according to the azimuth thereof with respect to the first ship. Note that, each of the icons and the like is always displayed at right above the second reference line 92 and in a fixed size, regardless of the distance from the first ship. Therefore, in the following description, this section may be referred to as the horizontal plot section (second display section) 52.

In the horizontal plot section 52, a distant view seen from the first ship is displayed. However, since the expression in perspective is eliminated as described above, a symbolic expression is provided in which simplicity and explicitness are more prioritized than realistic perspective. The user can understand whether the observed object or point is far to some extent from the first ship and grasp the azimuth thereof with respect to the first ship, by looking at the symbols and marks disposed within the horizontal plot section 52.

In the perspective plot section 51, objects, TT target objects, marks and the like which are located relatively close to the first ship (a shallow water area 61x, a point mark 63x, a next destination mark 65x, a TT target icon 67x, and a wind direction-and-speed icon 69x) are displayed. In the horizontal plot section 52, objects, marks and the like which are located relatively far from the first ship (a landmark symbol 62x, a homeport mark 64x, a final destination mark 65x) are displayed.

In the horizontal plot section 52 corresponding to the distant view, compared with the perspective plot section 51 corresponding to the near view, only the icons and the like which are narrowed down based on, for example, whether they are important or easy to be reference marks are displayed. The condition for displaying the icons and the like is different between the perspective plot section 51 and the horizontal plot section 52. Note that, in each of the perspective and horizontal plot sections 51 and 52, the condition for displaying the icons and the like can be determined by the user as described later.

In the perspective plot section 51, a guard line 53 is displayed to surround an area close to the first ship. When the dangerous area, the objects and/or the like are inside the section defined by the guard line 53 (guard zone), they are displayed in a different mode from dangerous areas and the objects outside the section defined by the guard line 53, so as to inform the user that the possibility of being stranded or collision is high. In FIG. 4, a situation where the shallow water area 61x and the TT target icon 67x are displayed in red color so as to be emphasized since they are inside the section defined by the guard line 53 is hatched for the sake of convenience. Any display mode may be adopted to differentiate the objects and the like which are inside the section defined by the guard line 53; however, the display mode is preferably changed such that the objects and the like are displayed in a color that stands out as described above, or displayed to blink, so as to attract attention from the user.

Note that, there is a case where the objects and the like are preferably displayed to be emphasized even though they are not inside the section defined by the guard line 53. For example, for the TT target icon 67x, a distance between the object and the first ship when they approach each other the most (closest distance) is calculated, and if the obtained distance is shorter than a predetermined distance, the TT target icon 67x is preferably displayed to be emphasized even if it is outside the section defined by the guard line 53 and the possibility of collision against the first ship is preferably informed to the user. Since the calculating method of the closest distance is broadly known in the TT function, the detailed description thereof is omitted.

A boat icon 71x and a setting course 72x for autopilot are displayed at the center of the first reference line 91 in the lateral directions and indicate the relative position and the heading of the first ship with respect to the navigation route (route lines 66x). Moreover, the speed of the first ship, the absolute position of the first ship obtained by the GPS positioning and the like are displayed on the side of the boat icon 71x in the form of a digital meter. Thus, a meter section 54 is formed. The user can understand a specific situation of the first ship and therearound by checking the contents in the meter section 54.

Note that, when the relative position of the first ship with respect to the navigation route (route lines 66x) is changed in one of the lateral directions, the display position of the boat icon 71x is not changed, but instead, the display positions of the objects and the marks within the perspective plot section 51 and the horizontal plot section 52 are entirely changed in the corresponding direction. By constantly fixing the display position of the first ship to the center of the lateral directions as above, the image close to the user's perspective in actually steering the first ship can be provided.

Next, in the multi-function display device 11, a configuration of the controller 24 for displaying the perspective and horizontal plot sections 51 and 52 in the three-dimensional navigation image described above is described.

The controller 24 includes a display target information memory (memory) 31, a ship position memory 32, a relative position calculating module 33, a first determining module 35, a second determining module 36, a perspective plot section depicting module 37, and a horizontal plot section depicting module 38.

The display target information memory 31 stores information of various display targets which may be displayed in the three-dimensional navigation image. The display targets include the dangerous area stored in the nautical chart and where the water depth is shallow, the landmark, the TT target object (e.g., other ship), the second ship received by the AIS, the user registering point, the navigation route (waypoints), and the meteorological information/hydrographic information obtained by the DGPS beacons.

The display target information memory 31 stores the information of the display targets and the information of the positions of the display targets. Note that, among the display targets, for the dangerous areas where the water depth is shallow, the landmarks, the second ships, the user registering points, the navigation route (waypoints), and the meteorological information/hydrographic information, the terrestrial reference absolute positions are stored as the positions thereof in the display target information memory 31. On the other hand, for the TT target object, the relative position with respect to the first ship is stored in the display target information memory 31.

The memory contents (display targets) in the display target information memory 31 can be categorized into dynamic information which is frequently (in real time) updated and static information which is hardly updated. For example, since the TT target object or the second ship is updated by latest information as the position thereof is changed, it may be referred to as the dynamic information. On the other hand, the dangerous area stored in the nautical chart information and where the water depth is shallow, the landmark and the like may be referred to as the static information.

Moreover, the stored contents in the display target information memory 31 can be categorized into the information received through external communication, the information detected by the sensors, and the information obtained from the nautical information. For example, the second ship information is information obtained by receiving the AIS information from the second ship, and the meteorological information/hydrographic information is information obtained by receiving the DGPS beacons from the DGPS base stations. Meanwhile, the TT target object information is information obtained based on the detection result of the radar which is a sensor. The information of the dangerous area where the water depth is shallow, and the landmark are information obtained from the nautical chart information.

The first ship position memory 32 stores the absolute position of the first ship obtained based on the positioning signals from the GPS antenna 12. The stored contents in the first ship position memory 32 are updated by the latest ship position every time the GPS positioning is repeated and the first ship position is newly acquired.

The relative position calculating module 33 calculates, with respect to the first ship, the relative position (distance and azimuth) of each of the display targets stored in the display target information memory 31. The absolute position of the first ship stored in the first ship position memory 32 is used to calculate the relative position. Note that, regarding the TT target object, since the relative position is already stored in display target information memory 31, the relative position is not calculated by the relative position calculating module 33.

The first determining module 35 determines whether the information of the position of the display target is within the first target section (the section defined by the reference numeral 56 in FIG. 3) which is near and in front of the first ship traveling the navigation route with respect to the position of the first ship and the extending direction of the navigation route. The first target section 56 is defined to have a certain distance from the position of the first ship and a certain azimuth range. The first determining module 35 allows the display target to be displayed within the perspective plot section 51, when the position of the display target is within the first target section 56 and a first display condition is satisfied.

The first display condition is for determining whether to display each display target based on the kind thereof. The user can specify the condition in a three-dimensional navigation setting screen described later (see the "near view display" section 101 in FIG. 5). For example, since the items indicated by the shallow water area 61, the TT target icon 67, and the AIS second ship icon 68 can be dangerous if they approach the first ship, it is extremely preferred to display them within the perspective plot section 51. Also for the other symbols and marks (e.g., the landmark symbol 62x, the point mark 63x, the homeport mark 64x, and the destination mark 65x), since there is high possibility for the user to obtain useful information if they are displayed, it is preferred to display them within the perspective plot section 51.

Figure 5:
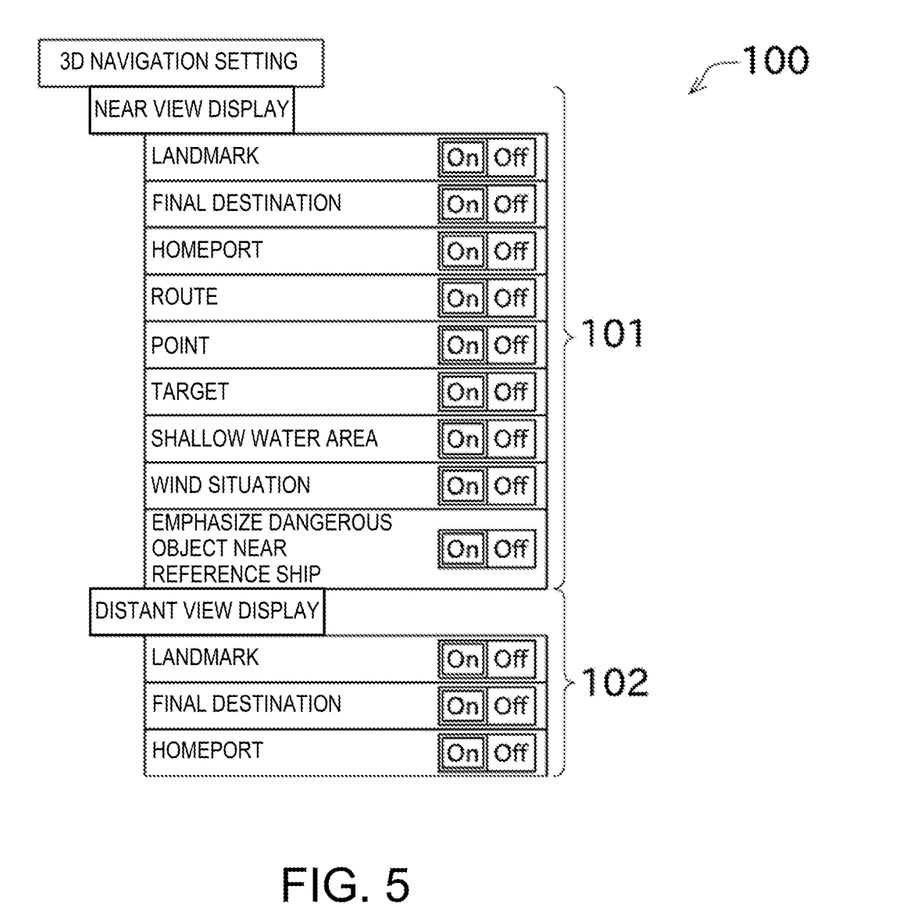
FIG. 5 is a view illustrating a setting screen related to three-dimensional navigation.

The second determining module 36 determines whether the positions of the display target are within the second target section (the section defined by the reference numeral 57 in FIG. 3) and a second display condition is satisfied. The second target section 57 is a section comparatively far from the first ship in the forward direction in the navigation route. The second target section 57 is also defined with reference to the position of the first ship and the extending direction of the navigation route, similar to the first target section 56. Moreover, the distance range of the second target section 57 indicates distance farther than the first target section 56. When the relative positions of the display targets are within the second target section 57 and the second display condition is satisfied, the second determining module 36 allows the display target to be displayed.

Similar to the first display condition, the second display condition is for determining whether to display each display target based on the kind thereof. The user can specify the second condition in the three-dimensional navigation setting screen (see the "distant view display" section 102 in FIG. 5). Note that, for the shallow water area 61x, the TT target icon 67x and the destination marks 65x excluding the final destination, if they are located far from the first ship, displaying them is not only unuseful, but also complicates the view on the display screen. Therefore, with the multi-function display device 11 of this embodiment, the setting for whether to display the contents in the second display condition can only be performed for the landmark, the final destination, and the homeport, and the other contents are always not displayed.

Note that, the first and second target sections 56 and 57 are described by using the plotter image in FIG. 3 for the sake of convenience. The first and second target sections 56 and 57 are not designed for the plotter image, but are defined based on the actual positional relationships with the first ship and the navigation route.

Hereinafter, a case of narrowing down the display contents described above is described by comparing the plotter image of FIG. 3 with the three-dimensional navigation image of FIG. 4. In the plotter image of FIG. 3, contents including the shallow water area 61, the landmark symbol 62, the point mark 63, the homeport mark 64, the plurality of destination marks 65, the TT target icon 67, and the AIS second ship icon 68 are located within the second target section 57. In this embodiment, only the landmark symbol 62x which is easily viewable as a reference mark even from a far distance in practical use, the homeport mark 64x, and one of the destination marks 65x that indicates the final destination (W4), are displayed within the horizontal plot section 52 of the three-dimensional navigation image (FIG. 4). Since the various symbols and marks are narrowed down first before being displayed within the horizontal plot section 52 as above, the user can accurately obtain the information useful in navigation without feeling complexity from the view on the display screen.

The perspective plot section depicting module 37 controls the display unit 22 to depict the display target which is allowed by the first determining module 35 to be displayed, in the perspective plot section 51 of FIG. 4. Here, the display target is controlled in its depicted position in the lateral directions such that, with respect to the straight line drawn from the first ship to be in parallel to the navigation route, the display target is displayed more leftward as the distance of the display target from the first ship to the left direction becomes longer, and more rightward as the distance of the display target from the first ship to the right direction becomes longer. Moreover, in a lower part of the perspective plot section 51, the perspective plot section depicting module 37 depicts the display target which is close to the first ship, in a large size. In an upper part of the perspective plot section 51, the perspective plot section depicting module 37 depicts the display target which is far from the first ship, in a small size.

The horizontal plot section depicting module 38 controls the display unit 22 to depict the display target which is allowed by the second determining module 36 to be displayed, in the horizontal plot section 52 of FIG. 4. Here, the display target is controlled in its depicted position in the lateral directions such that the display target is displayed more leftward as the azimuth of the display target with respect to the first ship shifts leftward from the navigation route, and more rightward as the azimuth of the display target with respect to the first ship shifts rightward from the navigation route. Note that, the horizontal plot section depicting module 38 controls the display unit 22 such that the depicted position of the display target in the up-and-down directions does not change (at immediately above the second reference line 92) and the size thereof does not change regardless of the distance of the display target from the first ship.

Thus, within the perspective plot section 51 of the three-dimensional navigation image of FIG. 4, the shallow water area 61x, the point mark 63x, the destination mark 65x closest to the first ship in the forward direction of the navigation route, the route lines 66x, the TT target icons 67x, and the wind direction-and-speed icon 69x are displayed in perspective according to the distances and azimuths with respect to the first ship. Moreover, within the horizontal plot section 52, the landmark symbol 62x, the homeport mark 64x, and the final destination mark 65x are displayed by being aligned on the second reference line 92 according (only) to the azimuths thereof with respect to the first ship.

Note that, among the display targets displayed within the perspective plot section 51, the TT target icon 67x can be said to be the dynamic information described above, which is detected by the radar apparatus which is a sensor. The wind direction-and-speed icon 69x can be said to be the meteorological information/hydrographic information received through the external communication (DGPS beacons). Further, among the display targets displayed within the horizontal plot section 52, the landmark symbol 62x can be said to be the static information described above, which is obtained from the nautical chart information.

As described above, for the display targets in the near view (target objects and points), the positional relationship to which the distance from the first ship is reflected is expressed within the perspective plot section 51. For the display targets in the distant view, the positional relationship to which only the azimuth with respect to the first ship is reflected regardless of the distance from the first ship is expressed within the horizontal plot section 52. Thus, for the near view, the user can instinctively understand the situation around the first ship in perspective, and as for the distant view, the user accurately can understand the information useful in the navigation of the first ship, such as a substantial azimuth of a particularly important location.

Next, the three-dimensional navigation setting screen provided for the user to specify the first and second display conditions is described with reference to FIG. 5.

The controller 24 of the multi-function display device 11 controls the display unit 22 to display the three-dimensional navigation setting screen 100 as illustrated in FIG. 5, according to the operation of the user interface 23. The three dimensional navigation setting screen 100 has the "near view display" section 101 and the "distant view display" section 102, and the user can specify the display targets to be displayed and the display targets not to be displayed. Note that, the "near view display" means the display setting for the perspective plot section 51, and the "distant view display" means the display setting for the horizontal plot section 52.

In the "near view display" section 101, whether to display or not can be specified for each of the landmark, the final destination (i.e., the waypoint indicating the final destination), the homeport, the route (i.e., the route lines and the waypoints excluding the final destination), the points (user registering points), the targets (TT targets and AIS second ship symbols), the shallow water area, and a wind situation (wind direction-and-speed icon). The specification can be performed by using the touch panel 27 provided to the display unit 22, and the user can specify by touching a position corresponding to an on/off button of each item. Thus, the user can specify the display targets to be displayed within the perspective plot section 51 indicating the near view (first display condition) as he/she prefers.

Moreover, in the "near view display" section 101, when a dangerous object is detected near the first ship, it can be specified whether to display it in an emphasized manner. Thus, the user can specify whether to display it in the emphasized manner as illustrated in FIG. 4 when the shallow water area inside the section defined by the guard line 53 or the TT target object of which the closest distance is shorter than a predetermined distance is detected.

In the "distant view display" section 102, whether to display or not can be specified for each of the landmark, the final destination, and the homeport. Thus, the user can specify the display targets to be displayed within the horizontal plot section 52 indicating the distant view (second display condition) as he/she prefers.

Note that, the number of targets of information for which whether to display can be specified by the user in the "distant view display" section 102 is smaller than that in the "near view display" section 101. Thus, the setting for display can be performed with a large degree of freedom for the near view, and in a simple manner for the distant view. Moreover, a suitable balance of the amount of the information displayed can be naturally achieved between the situation near the first ship and a situation of a wide area.

Furthermore, the specification of whether to display by the user in the "distant view display" section 102 can only be performed for one or some of the targets of information for which the user can specify whether to display in the "near view display" section 101. Therefore, the relationship between the first and second display conditions becomes easy to organize, and thus, it becomes easy to specify each condition.

Figure 6:
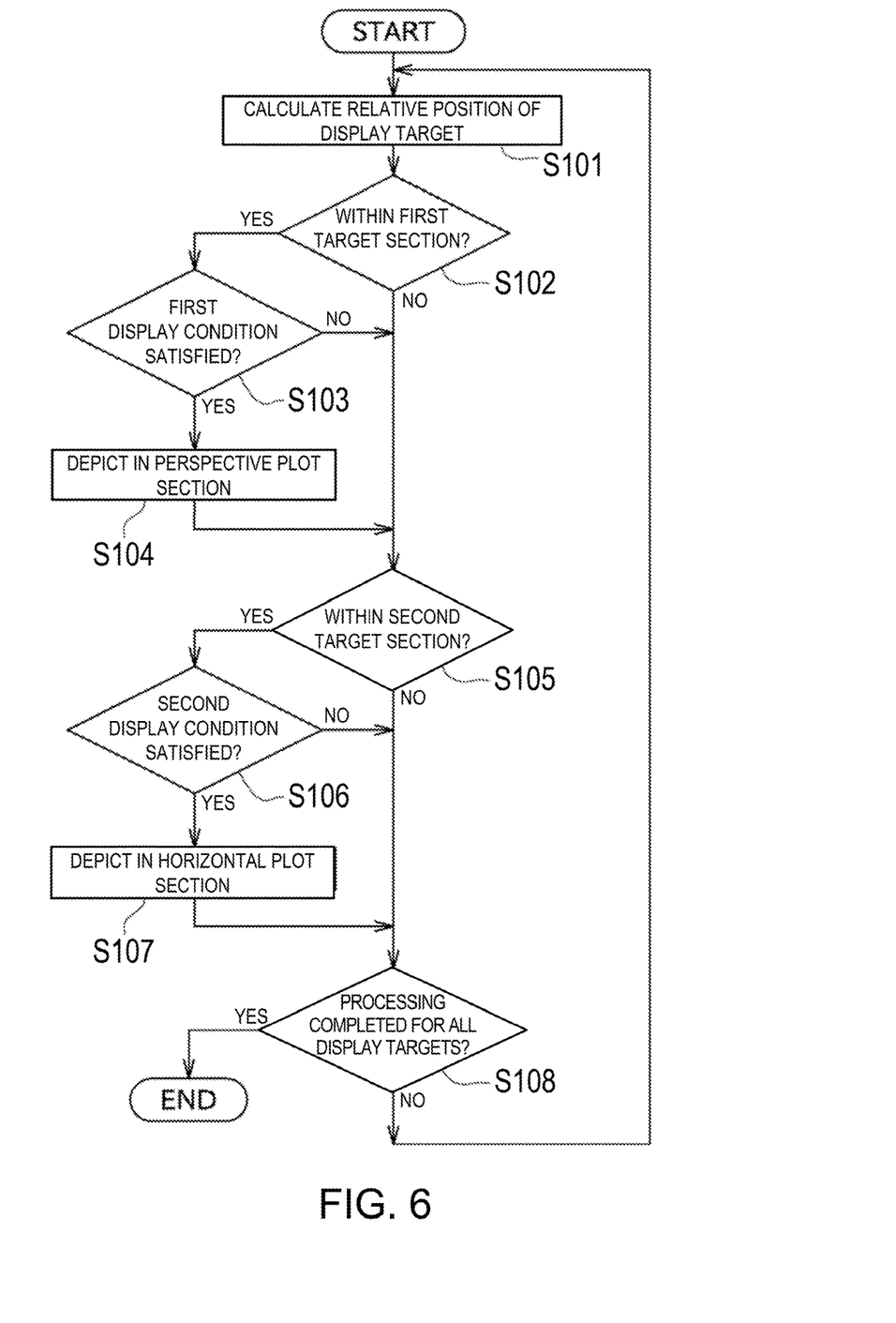
FIG. 6 is a flowchart illustrating processing when a display target is displayed in the three-dimensional navigation image.

Hereinafter, the depiction processing performed by the controller 24 to create the three-dimensional navigation image is described with reference to the flowchart of FIG. 6. FIG. 6 is a flowchart illustrating processing performed by the controller 24 to display the three-dimensional display target.

First, the controller 24 calculates the relative position of the display target (the distance from the first ship or the azimuth with respect to the first ship) based on the absolute position of each display target of which position is stored in the display target information memory 31 and the absolute position of the first ship obtained from the GPS positioning (S101). Note that, although it is not particularly indicated in the flowchart of FIG. 6, among the display targets, the calculation of the relative position of the TT target object (e.g., other ship) at S101 is skipped since it is already obtained.

Next, the controller 24 determines whether the position of the display target is within the first target section 56 illustrated in FIG. 3 (S102). Although the position of the display target is determined by using the relative position of the display target calculated at S101 in this embodiment, it may be determined by using the absolute position. If the position of the display target is within the first target section 56, the controller 24 determines whether the display target satisfies the first display condition described above (S103). Note that, in depicting the display target in the perspective plot section 51, the depict position is calculated based on the relative position (the distance and azimuth of the display target from the first ship) obtained at S101. If the first display condition is satisfied, the display target is depicted in the perspective plot section 51 (S104). If the first display condition is not satisfied, the depiction in the perspective plot section 51 is not performed.

Next, the controller 24 determines whether the position of the display target is within the second target section 57 illustrated in FIG. 3 (S105). If the position of the display target is within the second target section 57, the controller 24 determines whether the display target satisfies the second display condition described above (S106). If the second display condition is satisfied, the display target is depicted in the horizontal plot section 52 (S107). Note that, in depicting the display target in the horizontal plot section 52, the depict position is calculated based on the relative position (the distance and azimuth of the display target from the first ship) obtained at S101. If the second display condition is not satisfied, the depiction in the horizontal plot section 52 is not performed.

The controller 24 repeats the processing from S101 to S107 until the processing is completed for all of the display targets (S108). Thus, the depiction processing of the display target to the three-dimensional navigation image is achieved.

As described above, the multi-function display device 11 of this embodiment includes the display target information memory 31, the display unit 22, and the controller 24. The display target information memory 31 stores the information along with the position at which the information is existed. The display unit 22 displays the information. The controller 24 controls the display unit 22 to simultaneously display the perspective plot section 51 and the horizontal plot section 52. In the perspective plot section 51, part of the information is displayed such that a display position thereof in the vertical directions of the display screen becomes higher as the distance thereof from the first ship to which the multi-function display device 11 is mounted becomes longer. In the horizontal plot section 52, the information is displayed such that its display position is changed in one of the lateral directions according to the azimuth thereof with respect to the first ship and is fixed in the up-and-down directions regardless of the distance from the ship.

Thus, the information can be provided to the user in a form in which the overall information and detailed information are well balanced, for example, the situation of the wide area is provided in a simple form and the situation near the first ship is provided in detail, while achieving in displaying images from a view close to an actual line of sight of the user.

Next, another example of displaying the three-dimensional navigation image is described with reference to FIG. 7.

In other words, in the perspective plot section 51 of the three-dimensional navigation image, the method of expressing the water surface (sea surface) around the first ship in perspective is not limited to drawing a plane with orthogonal coordinates in the one-point perspective as FIG. 4. For example, as illustrated in FIG. 7, a method using radially straight lines 95 radially spreading from the first ship position, and elliptic arcs 96 centering on the first ship position and crashed in the up-and-down directions may be considered. Thus, the water surface is expressed substantially in a polar coordinate plane centering on the first ship position. In the display example of FIG. 7, the guard line 53 forms an elliptic arc.

Figure 7:
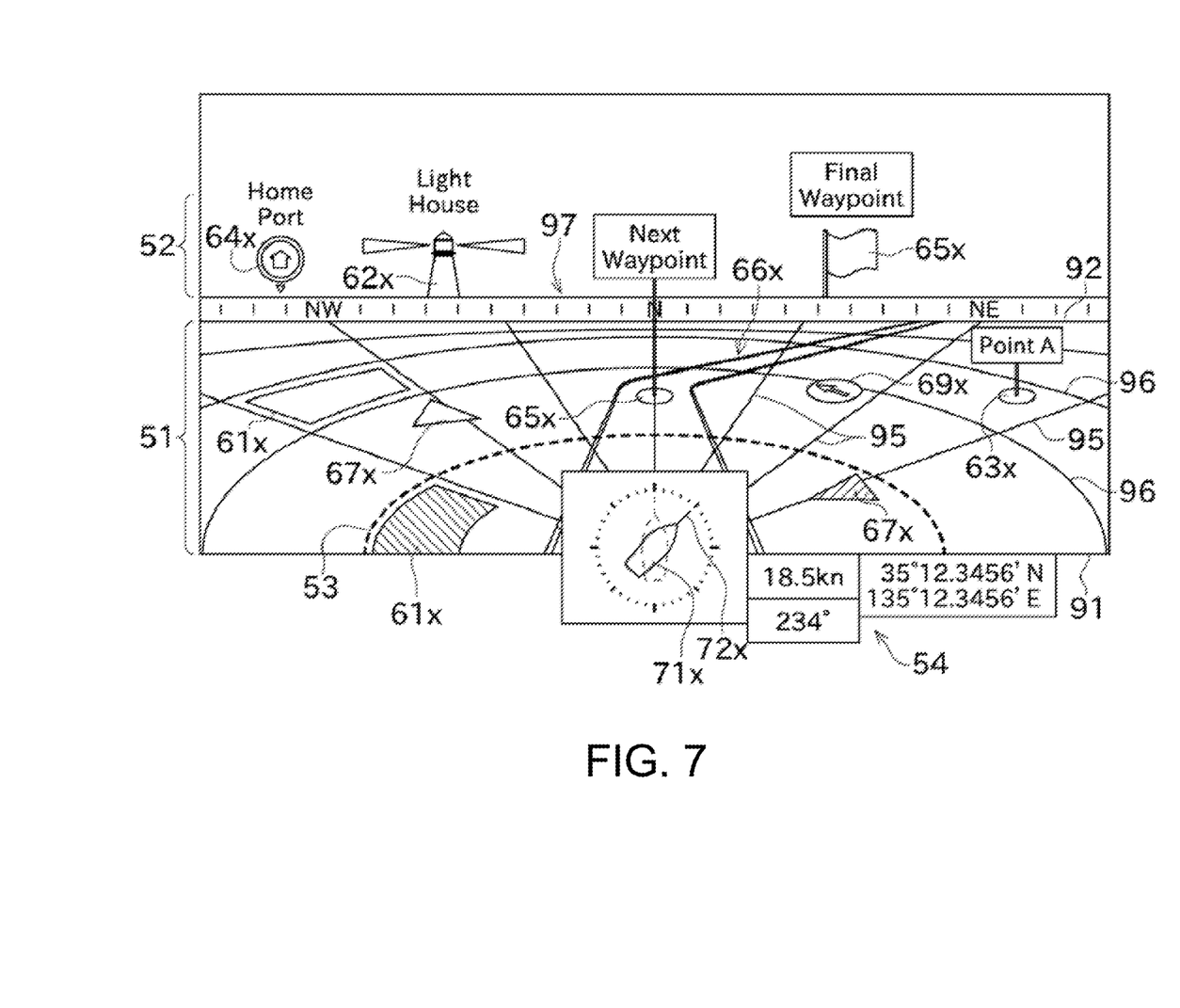
FIG. 7 is a view illustrating another example of the three-dimensional navigation image.

Note that, in the display example of FIG. 7, an azimuth scale 97 is displayed in a manner of separating the perspective plot section 51 from the horizontal plot section 52. Thus, the user can easily confirm the azimuths of the lighthouse and the homeport and the like displayed as the distant view, by referring to the landmark symbol 62x, the homeport mark 64x or the like, and the azimuth scale 97.

Although the preferred embodiment of this disclosure is described, the above configuration may be modified as follows.

The design of the first and second target sections 56 and 57 are not limited to FIG. 3, and may be designed into any shape according to the size of the three-dimensional navigation image, etc. Specifically, the first target section 56 may be designed into a fan shape, for example. Moreover, a modification may be adopted in which without providing the upper limit in the distance from the ship for the second target section 57, the display target is remained displayed within the horizontal plot section 52 as long as the azimuth condition is satisfied regardless of the distance from the ship.

The display mode of the display targets displayed in the three-dimensional navigation image is not limited to the above examples, and may suitably be changed. For example, a modification may be adopted in which the trace of the TT target object (e.g., other ship) is only displayed within the perspective plot section 51 corresponding to the near view. Moreover, a modification may be adopted in which alternative to or in addition to the wind direction-and-speed icon, weather, a water temperature, and an ocean current may be displayed by using icons. Further, among the landmarks, if the channel buoy is at a far distance from the first ship, since it is difficult to be a reference mark, it may be designed not to be displayed in the horizontal plot section 52 corresponding to the distant view.

In the meter section 54, in addition to or alternative to the first ship position and the like, an engine speed, a fuel amount, a fish finding image, wind direction and speed measured by the first ship, a water depth and the like may be displayed. Various modes can be considered for the display mode of the meters, such as a digital display mode, a display mode imitating an analog meter, or a chart display mode. Moreover, the meter section 54 may be disposed on the upper side of the horizontal plot section 52.

In this embodiment, the display position of the first ship to be displayed in the three-dimensional navigation image (boat icon 71x) is always fixed to the center of the first reference line 91 in the lateral directions. Alternatively, for example, a modification may be adopted in which the navigation route (route lines 66x) is always displayed at the center of the display screen in the lateral directions, and the display position of the boat icon moves in one of the lateral directions as the first ship position with respect to the navigation route is changed.

The multi-function display device 11 of this embodiment may also be used by being mounted to movable bodies other than ships. Moreover, the function of the multi-function display device 11 may be achieved in a suitable mobile device (e.g., smartphone).

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. An information display device, comprising:
a GNSS receiver configured to receive a current position of a ship from a GNSS sensor;
a memory configured to store nautical chart information along with the current position, the nautical chart information being configured to be combined with data corresponding to a plurality of nautical objects including at least one hazard or obstacle superimposed on a nautical chart;
a display configured to display the nautical chart information on a display screen thereof; and
processing circuitry configured to control the display to display a navigation route at a display position fixed in lateral directions on the display screen, and
to simultaneously display a perspective plot section and a horizontal plot section,
wherein in the perspective plot section, a plurality of straight lines radially spreading from a point are displayed with orthogonal coordinates in a one-point perspective, and
a first portion of the plurality of nautical objects in the nautical chart information located in a near area from the current position is displayed according to a distance and an azimuth of the nautical chart information, and
wherein in the horizontal plot section, a second portion of the plurality of nautical objects in the nautical chart information located in a far area from the current position is displayed according to a direction of the nautical chart information such that display positions of nautical objects in the second portion of the plurality of nautical objects are displayed more leftward as azimuths of the nautical objects with respect to the ship shift leftward from the route, and more rightward as the azimuths of the nautical objects with respect to the ship shift rightward from the route, and the display positions are fixed in vertical directions of the display screen regardless of the distance of the nautical chart information.

2. The information display device of claim 1, wherein in the vertical directions of the display screen, the horizontal plot section is disposed on an upper side of the perspective plot section.

3. The information display device of claim 1, wherein the processing circuitry controls the display to display the current position at a display position fixed in the lateral directions of the display screen.

4. The information display device of claim 1, wherein the processing circuitry controls the display to display the current position in the form of an icon.

5. The information display device of claim 1, wherein the processing circuitry controls the display to also display an azimuth scale within the horizontal plot section.

6. The information display device of claim 1, wherein the nautical chart information displayed within the perspective plot section is dynamic information, and the nautical chart information displayed within the horizontal plot section is static information.

7. The information display device of claim 1, wherein the nautical chart information displayed within the perspective plot section is either one of the data received through external communication and the data detected by ship sensors, and
wherein the nautical chart information displayed within the horizontal plot section is predetermined nautical chart information.

8. The information display device of claim 7, wherein the data received through the external communication is any of weather, wind direction, wind speed, water temperature, water current, and information of at least one other ship.

9. The information display device of claim 7, wherein the data detected by the ship sensors is information detected by either one of a radar and a sonar.

10. The information display device of claim 1, wherein the nautical chart information stored in the memory includes any of information of a target object, information of a location registered by a user, and landmark information.

11. The information display device of claim 1, wherein the processing circuitry controls the display to display a meter section in which at least one of a situation of the information display device and a situation of the ship is displayed, simultaneously with the perspective and horizontal plot sections.

12. The information display device of claim 11, wherein the nautical chart information displayable within the meter section includes at least one of a position, speed, and azimuth of one of the information display device and the ship.

13. A method of displaying nautical chart information on a display screen of a display, the method comprising:

storing the nautical chart information along with a current position of a ship in memory, the nautical chart information being configured to be combined with data corresponding to a plurality of nautical objects including at least one hazard or obstacle superimposed on a nautical chart; and at a processing circuitry in an information display device of the ship, instructing the display to display a navigation route at a display position fixed in lateral directions on the display screen, and simultaneously display a perspective plot section and a horizontal plot section, determining, based at least in part on a distance and an azimuth of the nautical chart information for each nautical object of the plurality of nautical objects in the nautical chart information, that a first portion of the plurality of nautical objects satisfies a first display condition, and a second portion of the plurality of nautical objects satisfies a second display condition, wherein in the perspective plot section, a plurality of straight lines radially spreading from a point are displayed with orthogonal coordinates in a one-point perspective, and the first portion of the plurality of nautical objects in the nautical chart information located in a near area from the current position is displayed according to the distance and the azimuth of the nautical chart information, and wherein in the horizontal plot section, the second portion of the plurality of nautical objects in the nautical chart information located in a far area from the current position is displayed according to a direction of the nautical chart information such that display positions of nautical objects in the second portion of the plurality of nautical objects are displayed more leftward as azimuths of the nautical objects with respect to the ship shift leftward from the route, and more rightward as the azimuths of the nautical objects with respect to the ship shift rightward, and the display positions are fixed in vertical directions of the display screen regardless of the distance of the nautical chart information.

14. The method of displaying the nautical chart information of claim 13, further comprising:

disposing the horizontal plot section on an upper side of the perspective plot section.

15. The information display device of claim 1, wherein the point is the current position, and wherein a plurality of elliptic arcs centered on the current position are displayed.

16. The information display device of claim 1, wherein the point is a center point of a reference line.

* * * * *